United States Patent
Wang et al.

(10) Patent No.: US 11,272,567 B2
(45) Date of Patent: Mar. 8, 2022

(54) ADAPTATION HANDLING FOR LAYER-2-BASED SIDELINK RELAY

(71) Applicant: MediaTek Singapore Pte. Ltd., Singapore (SG)

(72) Inventors: Xuelong Wang, Beijing (CN); Ming-Yuan Cheng, Hsin-Chu (TW); Nathan Edward Tenny, San Jose, CA (US); Guan-Yu Lin, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/951,648

(22) Filed: Nov. 18, 2020

(65) Prior Publication Data

US 2021/0160957 A1 May 27, 2021

Related U.S. Application Data

(63) Continuation of application No. PCT/CN2019/120286, filed on Nov. 22, 2019.

(30) Foreign Application Priority Data

Nov. 12, 2020 (CN) .......................... 202011264368.0

(51) Int. Cl.
*H04W 80/02* (2009.01)
*H04W 88/04* (2009.01)
*H04W 28/02* (2009.01)
*H04L 47/34* (2022.01)
*H04W 92/18* (2009.01)

(52) U.S. Cl.
CPC ............. *H04W 80/02* (2013.01); *H04L 47/34* (2013.01); *H04W 28/0263* (2013.01); *H04W 28/0268* (2013.01); *H04W 88/04* (2013.01); *H04W 92/18* (2013.01)

(58) Field of Classification Search
CPC . H04W 80/02; H04W 88/04; H04W 28/0268; H04W 28/0263; H04W 92/18; H04W 28/065; H04W 40/22; H04W 72/087; H04W 72/10; H04L 47/34
See application file for complete search history.

(56) References Cited

U.S. PATENT DOCUMENTS

| 2011/0128908 A1* | 6/2011 | Lee | H04L 29/06 370/328 |
| 2018/0255499 A1* | 9/2018 | Loehr | H04W 40/22 |

(Continued)

*Primary Examiner* — Afshawn M Towfighi
(74) *Attorney, Agent, or Firm* — Helen Mao; Zheng Jin; Imperium Patent works (57) ABSTRACT

Apparatus and methods are provided for adaptation handling for L2-based sidelink relay for packet routing. In novel aspect, the sidelink adaptation protocol (SAP) layer inserts SAP header including the adaptation layer address (ALA) before routing the packet data to the next hop. In other embodiments, the SAP layer includes a sequence number (SN). In one embodiment, the SN number in the SAP layer is the same as the PDCP SN number. In another embodiment, the SAP layer assigns SN number. In other embodiments, the SAP layer performs bearer mapping between an ingress logical channel and an egress logical channel at one or more intermediate nodes. In one embodiment, the bearer mapping is based on the QoS information or is based on a fixed logical channel configuration.

20 Claims, 8 Drawing Sheets

(56) References Cited

U.S. PATENT DOCUMENTS

2018/0287866 A1\* 10/2018 Yoon .................. H04B 17/24
2021/0084547 A1\* 3/2021 Cheng ................. H04W 4/40
2021/0160957 A1\* 5/2021 Wang .................. H04W 88/04

\* cited by examiner

ADAPTATION HANDLING FOR LAYER-2-BASED SIDELINK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/120286, titled "Methods and Apparatus of Adaption Handling for Sidelink Relay," with an international filing date of Nov. 22, 2019. This application claims priority under 35 U.S.C. § 119 from Chinese Application Number CN 202011264368.0 titled "ADAPTATION HANDLING FOR LAYER-2-BASED SIDELINK RELAY" filed on Nov. 12, 2020. The disclosure of each of the foregoing documents is incorporated herein by reference. The disclosure of each of the foregoing documents is incorporated herein by reference.

TECHNICAL FIELD

The disclosed embodiments relate generally to wireless communication, and, more particularly, to adaptation handling for layer-2-based sidelink relay.

BACKGROUND 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability, and high throughput for device to device communications. Using sidelink for wireless relay provides a reliable and efficient way for traffic forwarding. For the early sidelink-based wireless relay services, such as the ProSe UE-to-Network relay, the traffic between the remote UE and the base station is forwarded at the IP layer by the relay UE. The relay operation was specified for LTE aiming at coverage expansion from the perspective of Layer-3 (L3) relay. The Layer-2 (L2) based relay using sidelink can improve the efficiency and flexibility.

Improvements and enhancements are required to achieve transmission flexibility with improved adaptation functionalities for sidelink relay scenarios.

SUMMARY

Apparatus and methods are provided for adaptation handling for L2-based sidelink relay for packet routing. In novel aspect, the segmentation or concatenation is performed for the data packets at sidelink adaptation protocol (SAP) layer by origination node or one or more intermediate relay nodes with the sidelink relay path. The SAP layer inserts SAP header including the adaptation layer address (ALA) before routing the packet data to the next hop. In other embodiments, the SAP layer includes a sequence number (SN). In one embodiment, the SN number in the SAP layer is the same as the PDCP SN number. In another embodiment, the SAP layer assigns SN number. In one embodiment, the UE in a sidelink relay path configures a SAP layer, which is a protocol layer between RLC layer and the PDCP layer. The UE receives a configuration for a layer-2 (L2)-based sidelink relay path, wherein the L2-based relay path includes one or more relay nodes, a source node and a destination node, and wherein at least one sidelink of the UE is configured in the L2-based relay path. The UE performs data packet segmentation or concatenation for relay path data packets on one or more sidelink of the UE at the SAP layer when the UE is configured as the source node or a relay node, inserts a SAP header at the SAP layer into the segmented or concatenated relay path data packets when the UE is configured as the source node or a relay node wherein the SAP header comprises an adaptation layer address (ALA) and routs data packets between the source node and the destination node based on the configured L2-based sidelink relay path.

In other embodiments, the SAP layer performs bearer mapping between an ingress logical channel and an egress logical channel at one or more intermediate nodes. In one embodiment, the SAP header of incoming data packets further comprises QoS information for data packets, and wherein the bearer mapping is based on the QoS information. In another embodiment, the bearer mapping is based on a fixed logical channel configuration with each logical channel associated with a fixed priority, and wherein the fixed logical channel configuration applies to all configured nodes for the L2-based sidelink relay path.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
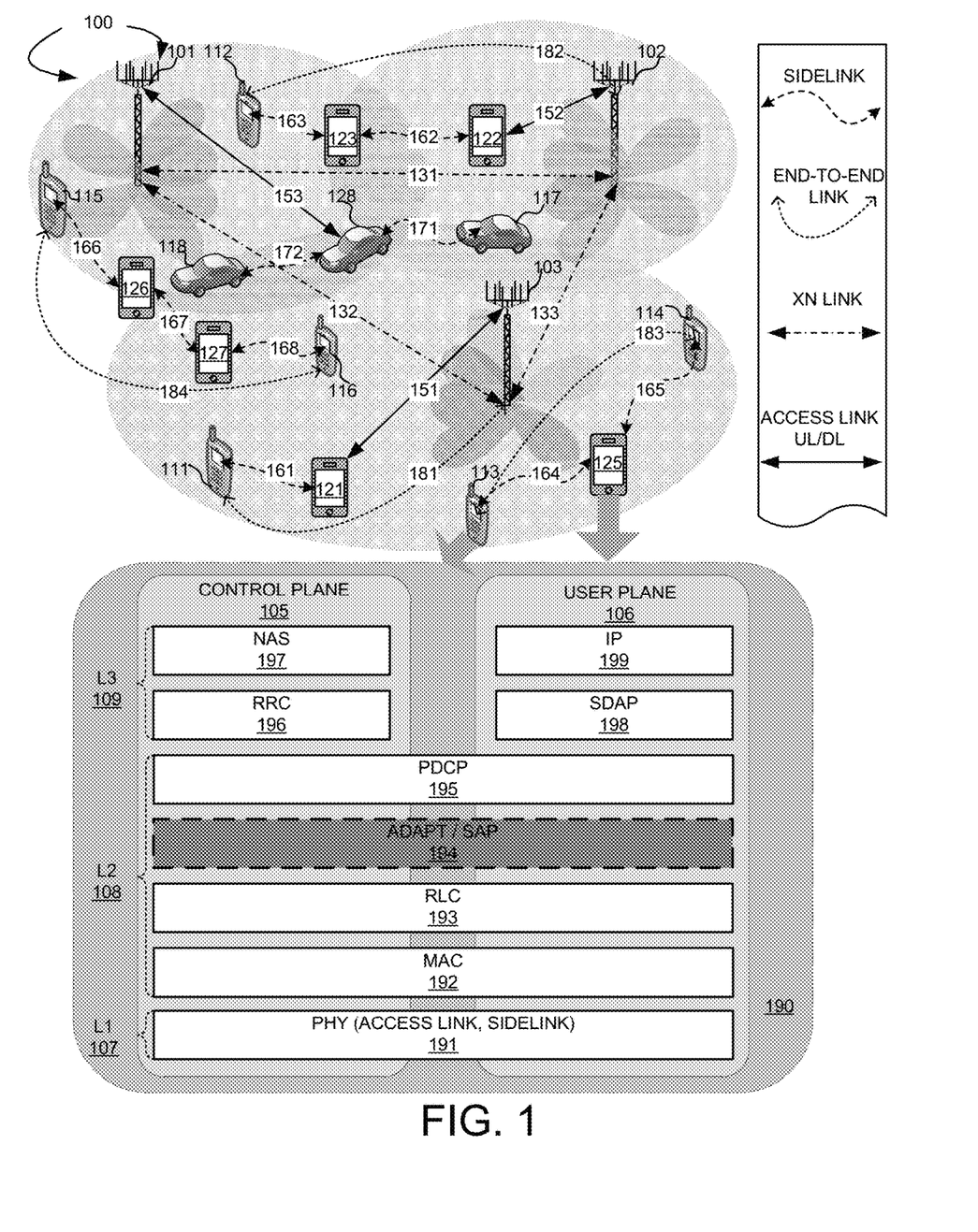
FIG. 1 is a schematic system diagram illustrating an exemplary wireless network for adaptation handling for L2-based sidelink relay and the UE protocol stack with the sidelink adaptation protocol (SAP) layer in accordance with embodiments of the current invention.

FIG. 1 is a schematic system diagram illustrating an exemplary wireless network for L2-based sidelink relay and the UE protocol stack with the sidelink adaptation protocol (SAP) layer in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 is connected with gNB 102 via Xnr interface 131 and is connected with gNB 103 via Xnr interface 132. gNB 102 is connected with gNB 103 via Xnr interface 133.

Wireless network 100 also includes multiple communication devices or mobile stations, such user equipments (UEs) such as UEs 111, 112, 113, 114, 115 and 116, 121, 122, 123, 124, 125, 126, and 127. Communication devices or mobile stations in wireless network 100 may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device may also be out of connection with the base stations with its access links but can transmit and receive data packets with another one or more other mobile stations or with one or more base stations through L2-based sidelink relay.

In one novel aspect, an adaptation layer is configured for L2-based sidelink relay. The adaptation layer performs sequence number (SN) handling and bearer mapping. The bearer mapping is performed by the relay nodes. In other embodiments, SN are inserted in the adaptation layer address (ALA) at the originator node and the relay nodes. FIG. 1 further illustrates different sidelink relay path configurations. In a first scenario, the L2-based UE-to-Network one-hop relay using sidelink is configured. A remote UE 111 and gNB 103 forms an end-to-end path 181 through a L2-based sidelink relay with a relay UE 121. End-to-end path 181 includes an access link 151 between gNB 103 and relay UE 121 and a sidelink 161 between remote UE 111 and relay UE 121. In a second scenario, the L2-based UE-to-Network multi-hop relay using sidelink is configured. A remote UE 112 and gNB 102 forms an end-to-end path 182 through a L2-based sidelink relay with a relay UE 122 and another relay UE 123. End-to-end path 182 includes an access link 152 between gNB 102 and relay UE 122, sidelink 162 between relay UE 122 and relay UE 123, and sidelink 163 between remote UE 112 and relay UE 123. In a third scenario, the L2-based UE-to-UE one-hop relay using sidelink is configured. An end node UE 113 and another end node UE 114 forms an end-to-end path 183 through a L2-based sidelink relay with a relay UE 125. End-to-end path 183 includes a sidelink 164 between end node UE 113 and relay UE 125 and a sidelink 165 between end node UE 114 and relay UE 125. In a fourth scenario, the L2-based UE-to-UE multi-hop relay using sidelink is configured. An end node UE 115 and another end node UE 116 forms an end-to-end path 184 through a L2-based sidelink relay with a relay UE 126 and another relay UE 127. End-to-end path 184 includes a sidelink 166 between end node UE 115 and relay UE 126, a sidelink 167 between relay UE 126 and relay UE 127, and a sidelink 168 between end node UE 116 and relay UE 127. In another embodiment, a relay mobile device is configured with multiple remote mobile devices or multiple end node mobile devices. A relay UE 128, with an access link 153 to gNB 101 is configured with two remote UEs 117 and 118 through sidelink 171 and 172, respectively. In other embodiments, a relay mobile device can be configured for multiple UE-to-UE relay paths. Different links are established for the illustrated relay paths. An access link is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station. A side link is a link between two mobile devices and uses PC5 interface. The sidelink can be a link between a remote UE/end-node UE and a relay UE or a link between two relay mobile devices/UEs for the multi-hop relay. The end-to-end link for a relay path can be a link between two end-node mobile devices for a UE-to-UE relay or a base station to mobile device for a UE-to-Network relay. An Xn link is the backhaul link between two base stations, such gNBs using the Xn interface. In one embodiment, candidate relay UE information is transmitted to the base station via the Xn link.

FIG. 1 further illustrates protocol stack 190 for an originator UE 113 or a relay UE 125 with the sidelink adaptation protocol (SAP) layer including both the control plane 105 and the user plane 106. UE protocol stack 190 includes L1 stacks 107, L2 stacks 108 and L3 stacks 109. L1 protocol stack 107 includes the PHY layer 191. L2 protocol stack 108 includes the MAC layer 192, radio link control (RLC) layer 193, adaptation layer/sidelink adaptation protocol (SAP) layer 194 and packet data convergence protocol (PDCP) layer 195. L3 protocol stack 108 includes control plane protocol stacks including radio resource control (RRC) layer 196 and non-access stratum (NAS) layer 197, and user plane protocol stacks including service data adaptation protocol (SDAP) layer 198 and IP layer 199. In one novel aspect, a source node or a relay node device, performs segmentation or concatenation for data packets at SAP layer 194. SAP layer 194 inserts SAP header to the data packets. In some embodiment, the SN number is included in the SAP header. In one embodiment, SAP layer 194 of the source node segments a single received packet from upper layer (i.e. PDCP layer) into a plural of packets and assigns new SN(s) before transmitting it to lower layer (i.e. RLC). In another embodiment, SAP layer 194 of the source node concatenates multiple received packets from upper layer (i.e. PDCP layer) into a single packet and assigns a new SN before transmitting it to lower layer (i.e. RLC). In yet another embodiment, SAP layer 194 of the intermediate relay UE segments a single received packet into multiple packets and assigns new SN(s) before transmitting it to the egress RLC channel.

Figure 2:
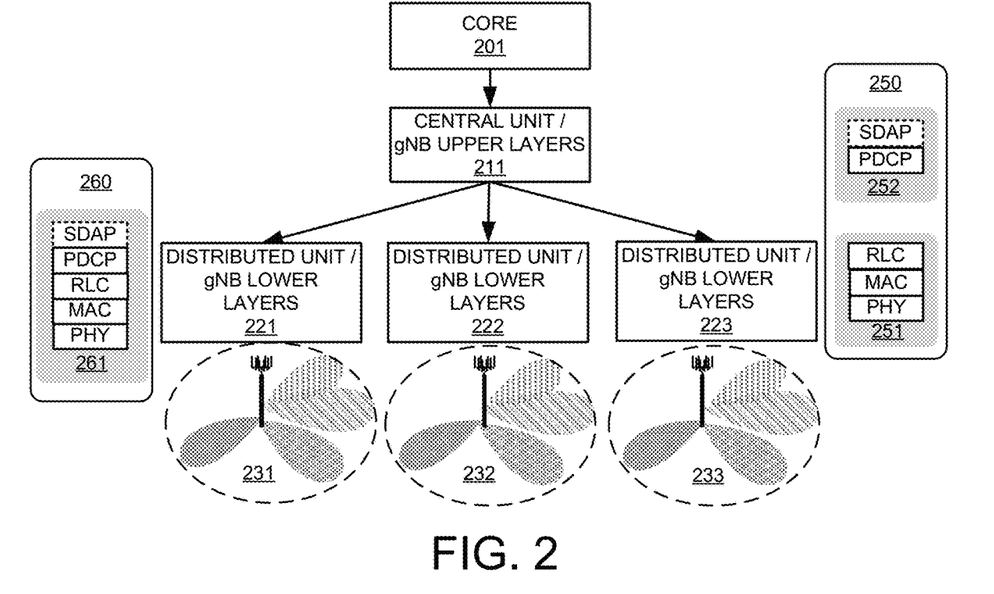
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A Core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 223. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3:
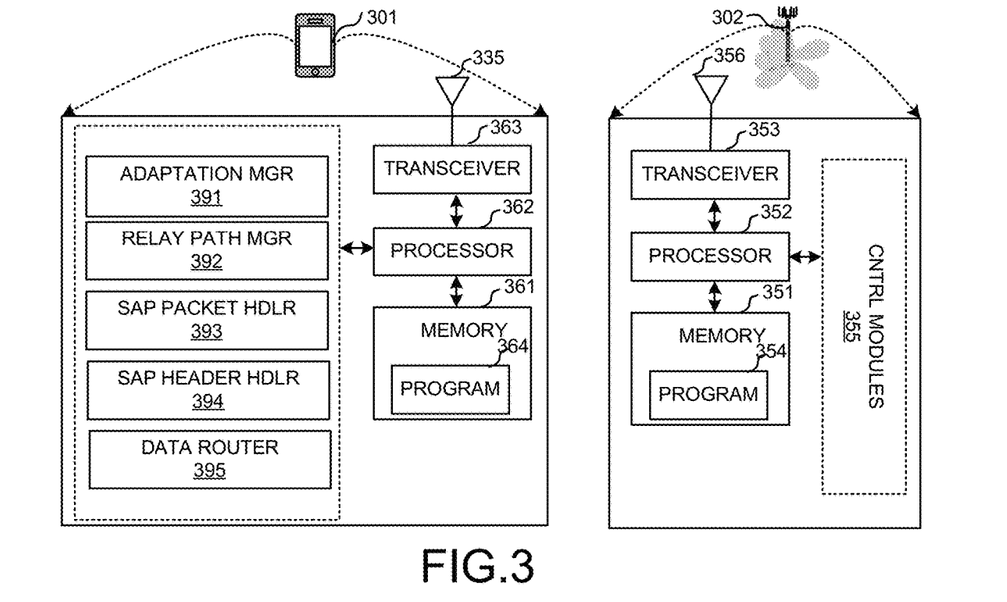
FIG. 3 illustrates simplified block diagrams of a base station and a mobile device/UE for adaptation handling for L2-based sidelink relay in accordance with embodiments of the current invention.

FIG. 3 illustrates simplified block diagrams of a base station and a mobile device/UE for adaptation handling for L2-based sidelink relay in accordance with embodiments of the current invention. gNB 302 has an antenna 356, which transmits and receives radio signals. An RF transceiver circuit 353, coupled with the antenna, receives RF signals from antenna 356, converts them to baseband signals, and sends them to processor 352. RF transceiver 353 also converts received baseband signals from processor 352, converts them to RF signals, and sends out to antenna 356. Processor 352 processes the received baseband signals and invokes different functional modules to perform features in gNB 302. Memory 351 stores program instructions and data 354 to control the operations of gNB 302. gNB 302 also includes a set of control modules 355 that carry out functional tasks to communicate with mobile stations.

UE 301 has an antenna 335, which transmits and receives radio signals. An RF transceiver circuit 363, coupled with the antenna, receives RF signals from antenna 335, converts them to baseband signals, and sends them to processor 362.

In one embodiment, the RF transceiver may comprise two RF modules (not shown). A first RF module is used for HF transmitting and receiving, and the other RF module is used for different frequency bands transmitting and receiving which is different from the HF transceiver. RF transceiver 363 also converts received baseband signals from processor 362, converts them to RF signals, and sends out to antenna 335. Processor 362 processes the received baseband signals and invokes different functional modules to perform features in UE 301. Memory 361 stores program instructions and data 364 to control the operations of UE 301. Antenna 335 sends uplink transmission and receives downlink transmissions to/from antenna 356 of gNB 302.

Mobile station 301 also includes a set of control modules that carry out functional tasks. These control modules can be implemented by circuits, software, firmware, or a combination of them. An adaptation manager 391 configures a sidelink adaptation protocol (SAP) layer, wherein the SAP layer is a protocol layer between a radio link control (RLC) layer and a packet data convergence protocol (PDCP) layer, and wherein the UE is configured with at least one sidelink. A relay path manager 392 receives a configuration for a layer-2 (L2)-based sidelink relay path, wherein the L2-based relay path includes one or more relay nodes, a source node and a destination node, and wherein at least one sidelink of the UE is configured in the L2-based relay path. A SAP packet handler 393 performs data packet segmentation or concatenation for relay path data packets on one or more sidelink of the UE at the SAP layer when the UE is configured as the source node or a relay node. A SAP header handler 394 inserts a SAP header at the SAP layer into the segmented or concatenated relay path data packets when the UE is configured as the source node or a relay node, wherein the SAP header comprises an adaptation layer address (ALA). A data router 395 routs data packets between the source node and the destination node based on the configured L2-based sidelink relay path.

Figure 4:
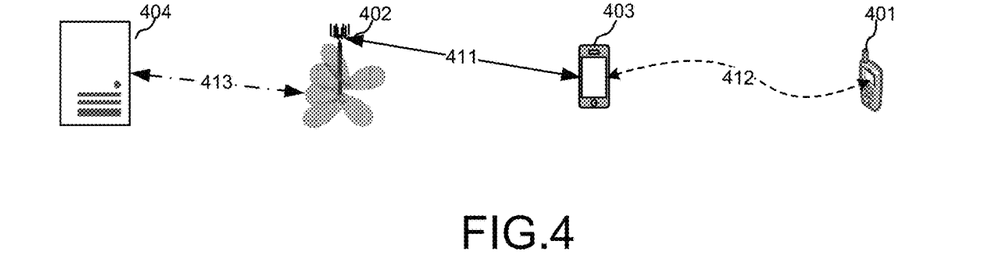
FIG. 4 illustrates exemplary diagrams NR wireless network with an integration of relay UE between the base station and the remote UE in accordance with embodiments of the current invention.

FIG. 4 illustrates exemplary diagrams NR wireless network with an integration of relay UE between the base station and the remote UE in accordance with embodiments of the current invention. A UE-to-Network relay with sidelink is a one-hop relay. A remote UE 401 established a relay path with a gNB 402 through a relay UE 403. Relay UE 403 communicates with gNB 402 via access link 413. Relay UE 403 communicates with remote UE 401 through sidelink 412. The sidelink is 3GPP specified radio link that enables V2X applications. gNB 402 transmits data packets destined to remote UE 401 through DL to relay UE 403 and receives data packets from remote UE 401 through UL from relay UE 403. The data path between remote UE 401 and gNB 402 includes access link 411 and sidelink 412. In a NR network, gNB 402 is connected with network entity 404 via S1 link 413.

Figure 5:
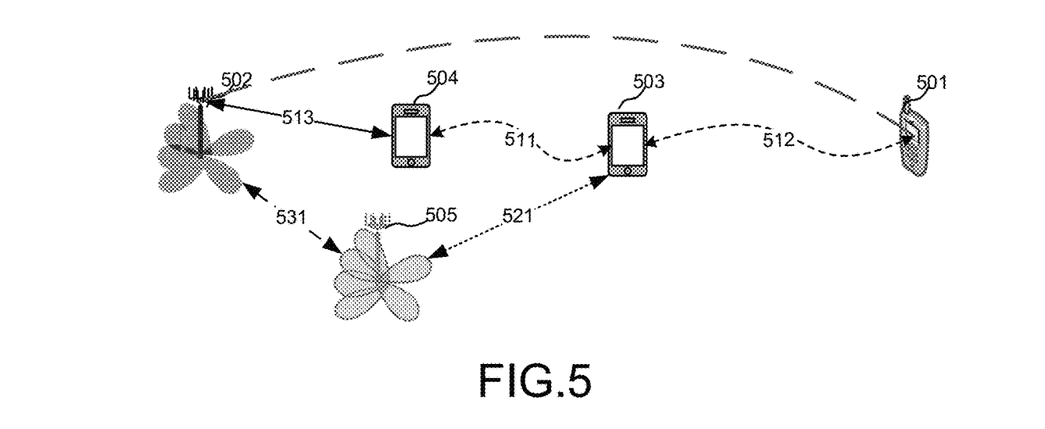
FIG. 5 illustrates exemplary diagrams for a NR wireless network with an integration of multiple relay UEs in accordance with embodiments of the current invention.

FIG. 5 illustrates exemplary diagrams for a NR wireless network with an integration of multiple relay UEs in accordance with embodiments of the current invention. A multi-hop UE-to-Network relay is configured. A remote UE 501 established a data path with a gNB 502 through relay UEs 503 and 504. Relay UE 504 communicates with gNB 502 via access link 513. Relay UE 504 communicates with relay UE 503 through sidelink 511. Relay UE 503 communicates with remote UE 501 through sidelink 512. gNB 502 transmits data packets destined to remote UE 501 through DL to relay UEs 504, which is forwarded to relay UE 503 through sidelink 511. gNB 502 receives data packets from remote UE 501 through UL from relay UE 504, which is forwarded from relay 503 through sidelink 512. The relay path between remote UE 501 and gNB 502 includes access link 513 and sidelink 511 and 512. Multi-hop relay can be configured with two or more relay UEs. In one embodiment, the one or more relay UEs and the remote UE/end-node UE are connected with base stations. In another embodiment, the remote UE may be out of range and is not connected with any base station. In other embodiments, the one or more relay UEs and the remote UE may be connected with different gNBs. For example, relay UE 503 is connected with network gNB 505 through access link 521, while relay UE 504 is connected with gNB 502 through access link 513. gNB 502 gets UE information of relay UE 503 from its serving gNB 505 through backhaul connections, such as the Xnr interface 531. In other multi-hop relay configurations, the combination of connection status of the relay UEs and the end-node UEs are possible as described above.

Figure 6:
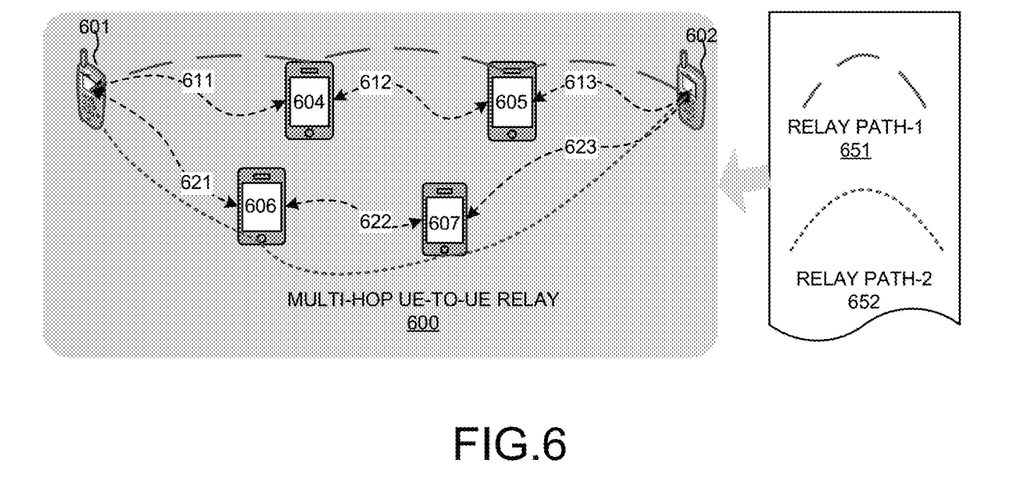
FIG. 6 illustrates exemplary diagrams for a NR wireless network with an integration of multiple relay paths configured in accordance with embodiments of the current invention.

FIG. 6 illustrates exemplary diagrams for a NR wireless network with an integration of multiple relay paths configured in accordance with embodiments of the current invention. In some embodiments, more than one relay paths are configured. The end point UEs, which are the originator UE or the destination UE of the configured relay path, may be configured with more than one relay path. The UE is configured with one active relay path to perform the data packet routing. The relay path may be updated to another configured relay path upon detecting one or more predefined triggering conditions. Two end-node UEs 601 and 602 are configured with multi-hop UE-to-UE relay communication through sidelinks. Multiple relay paths are configured for UE-to-UE relay between end-node UE 601 and end-node UE 602. In one embodiment, multiple relay UE candidates are identified, including UE 604, 605, 606, and 607. Based on the measurement reports from the candidate UEs, one or more relay paths are configured for end-node UEs 601 and 602 for L2-based UE-to-UE relay. In an exemplary scenario, end-node UE 601 has sidelink 611 and 621 with relay UE 604 and 606, respectively. Relay UE 604 has sidelinks 612 with relay UE 605. Relay UE 606 has one sidelink 622 with relay UE 607. Relay UEs 605 and 607 have sidelinks 613 and 623 with end-node UE 602, respectively. Two exemplary relay paths are configured for UE-to-UE L2-based sidelink relay between end-node UE 601 and 602. Relay path-1 651 includes sidelink 611 between end-node UE 601 and relay UE 604, sidelink 612 between relay UE 604 and relay UE 605, and sidelink 613 between relay UE 605 and end-node UE 602. Relay path-2 652 includes sidelink 621 between end-node UE 601 and relay UE 606, sidelink 622 between relay UE 606 and relay UE 607, and sidelink 623 between relay UE 607 and end-node UE 602. One relay path is selected to perform data communications between the end-node UEs. In one embodiment, the multiple relay paths configuration may include both multi-hop relay configuration and one-hop relay configuration. The end-nodes can switch among different configured relay paths based on switching rules. An end-node in a relay configuration can be a network node, such as a gNB or a mobile station node, such as a UE. In other embodiments, the multiple relay paths configuration applies to different type of sidelink relays as described above, including the one-hop UE-to-Network relay, the multi-hop UE-to-network relay and the one-hop UE-to-UE relay. Multiple relay UEs are connected in the wireless network with one or more network nodes.

Figure 7A:
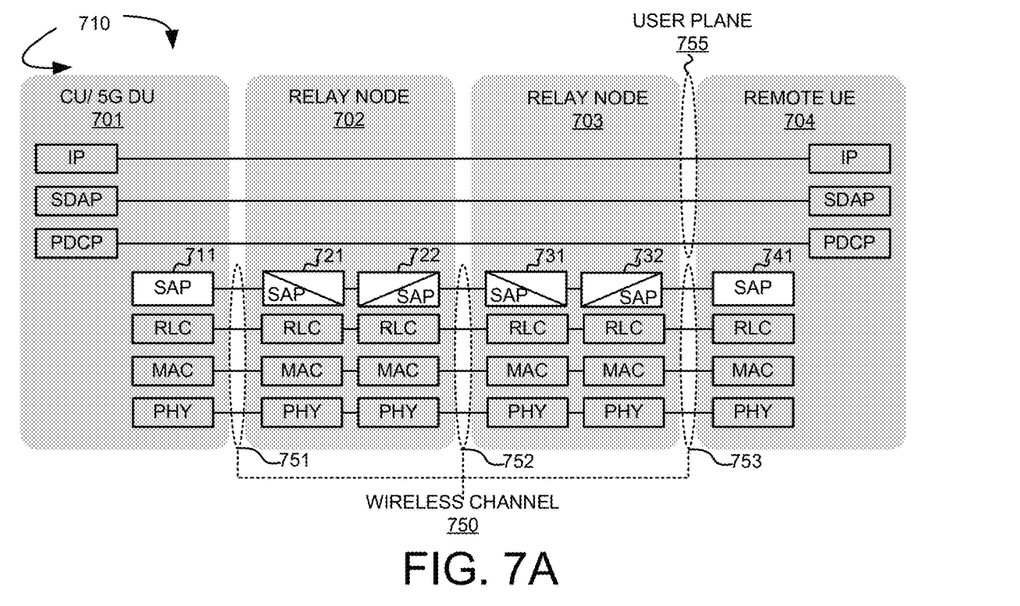
FIG. 7A illustrates an exemplary user plane protocol stacks for relay path between the base station and a remote UE with multiple relay UEs in accordance with embodiments of the current invention.

FIG. 7A illustrates an exemplary user plane protocol stacks for relay path between the base station and a remote UE with multiple relay UEs in accordance with embodiments of the current invention. An exemplary relay path stacks 710 includes a network protocol stack located within CU/5GC and DU 701 and a remote UE 704 stack, and two relay nodes 702 and 703 stacks. The CU/5GC and DU node 701 and the remote UE 704 are the origination and destination nodes of the relay path. The origination and the destination nodes are also called the end-nodes. The lower layer wireless channel 750 is established through the PHY, MAC, RLC and ADAPT layers of each node on the relay path. A first wireless link 751 is established between lower layer stack of CU/5GC and DU 701 and a first lower layer protocol stack of relay node 702. A second wireless link 752 is established between the second lower layer protocol stack of relay node 702 and a first lower layer protocol stack of relay node 703. A second lower layer protocol stack of relay node 703 establishes a third wireless link 753 with lower layer protocol stack of remote UE 704. In one embodiment, for a UE-to-Network relay, the first wireless link 751 is an RLC wireless link through an Uu interface between relay node 702 and the CU/5GC and DU node 701. The lower layer link between relay node 702 and 703 is a sidelink channel. The lower layer link between relay node 703 and remote UE 704 is a sidelink. On the user plane, end-to-end protocol connection 755 is established directly between the protocol stacks at the IP layer, the SDAP layer and the PDCP layer of CU/5GC and DU 701 and remote UE 704. The ADAPT/SAP layer of each node is used for packet routing of the L2-based sidelink relay. In one embodiment, each relay node is configured with two ADAPT layer stack. Relay node 702 has ADAPT 721 and 722. Relay node 703 has ADAPT 731 and 732. Each ADAPT stack of the one or more relay nodes is connected with an end-node ADAPT stack. ADAPT 721 of relay node 702 is connected with ADAPT 711 of end-node 701. ADAPT 732 of relay node 703 is connected with ADAPT 741 of end-node 704. In one novel aspect, the origination and relay nodes performs SN handling at the SAP layer. The relay nodes also performs bearer mappings at the SAP layer, such as ADAPT 721, 722, 731, and 732. Each ADAPT/SAP layer has an adaptation layer address (ALA).

Figure 7B:
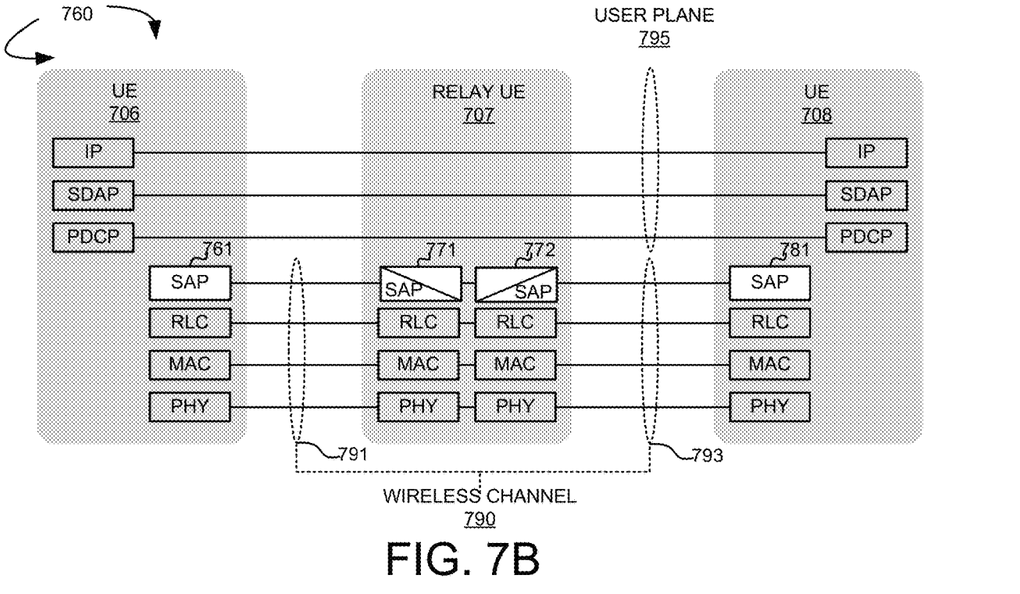
FIG. 7B illustrates an exemplary user plane protocol stacks for relay path between the originator UE and the destination UE with a relay UEs in accordance with embodiments of the current invention.

FIG. 7B illustrates an exemplary user plane protocol stacks for relay path between the originator UE and the destination UE with a relay UEs in accordance with embodiments of the current invention. An exemplary relay path stacks 760 includes protocol stacks of two end-nodes, an origination node 706 and a destination node 708, and a relay node UE 707. The lower layer wireless channel 790 is established through the PHY, MAC, RLC and ADAPT layers of each node on the relay path. A first wireless link 791 is established between UE 706 lower layer stack and a first lower layer protocol stack of relay node 707. A second wireless link 792 is established between the second lower layer protocol stack of relay node 707 and a lower layer protocol stack end-point UE 708. The lower layer links 791 and 792 are sidelink channels. On the user plane, end-to-end protocol connection 795 is established directly between the protocol stacks at the IP layer, the SDAP layer and the PDCP layer of end-nodes UE 706 and 708. The ADAPT/SAP layer of each node is used for packet routing of the L2-based sidelink relay. In one embodiment, the relay node is configured with two ADAPT layer stack. Relay node 707 has ADAPT/SAP 771 and 772. Each ADAPT stack of the relay nodes is connected with an end-node ADAPT stack. ADAPT 771 of relay node 707 is connected with ADAPT 761 of end-node 706. ADAPT 772 of relay node 707 is connected with ADAPT 781 of end-node 708. Each ADAPT/SAP layer has an adaptation layer address (ALA).

Figure 8A:
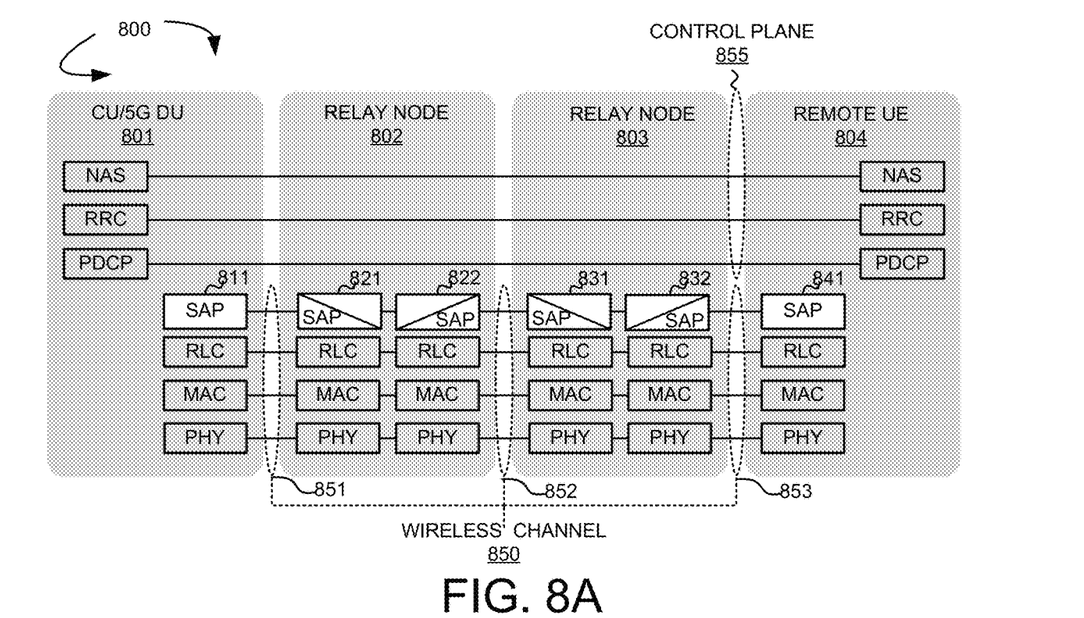
FIG. 8A illustrates an exemplary control plane protocol stacks for relay path between the base station and a remote UE with multiple relay UEs in accordance with embodiments of the current invention.

FIG. 8A illustrates an exemplary control plane protocol stacks for relay path between the base station and a remote UE with multiple relay UEs in accordance with embodiments of the current invention. An exemplary relay path stacks 810 includes a network protocol stack located within CU/5GC and DU 801 and a remote UE 804 stack, and two relay nodes 802 and 803 stacks. The CU/5GC and DU node 801 and the remote UE 804 are the origination and destination nodes of the relay path. The origination and the destination nodes are also called the end-nodes. The lower layer wireless channel 850 is established through the PHY, MAC, RLC and ADAPT layers of each node on the relay path. A first wireless link 851 is established between CU/5GC and DU 801 lower layer stack and a first lower layer protocol stack of relay node 802. A second wireless link 852 is established between the second lower layer protocol stack of relay node 802 and a first lower layer protocol stack of relay node 803. A second lower layer protocol stack of relay node 803 establishes a third wireless link 853 with lower layer protocol stack of remote UE 804. In one embodiment, for a UE-to-Network relay, the first wireless link 851 is an RLC wireless link through an Uu interface between relay node 802 and the CU/5GC and DU node 801. The lower layer link between relay node 802 and 803 is a sidelink channel. The lower layer link between relay node 803 and remote UE 804 is a sidelink. On the control plane, end-to-end protocol connection 855 is established directly between the protocol stacks at the NAS layer, the RRC layer and the PDCP layer of CU/5GC and DU 801 and remote UE 804. The ADAPT/SAP layer of each node is used for packet routing of the L2-based sidelink relay. In one embodiment, each relay node is configured with two ADAPT layer stack. Relay node 802 has ADAPT 821 and 822. Relay node 803 has ADAPT 831 and 832. Each ADAPT stack of the one or more relay nodes is connected with an end-node ADAPT stack. ADAPT 821 of relay node 802 is connected with ADAPT 811 of end-node 801. ADAPT 832 of relay node 803 is connected with ADAPT 841 of end-node 804. In one novel aspect, the origination and relay nodes perform SN handling at the SAP layer. The relay nodes also perform bearer mappings at the SAP layer, such as ADAPT 821, 822, 831, and 832. Each ADAPT/SAP layer has an adaptation layer address (ALA).

Figure 8B:
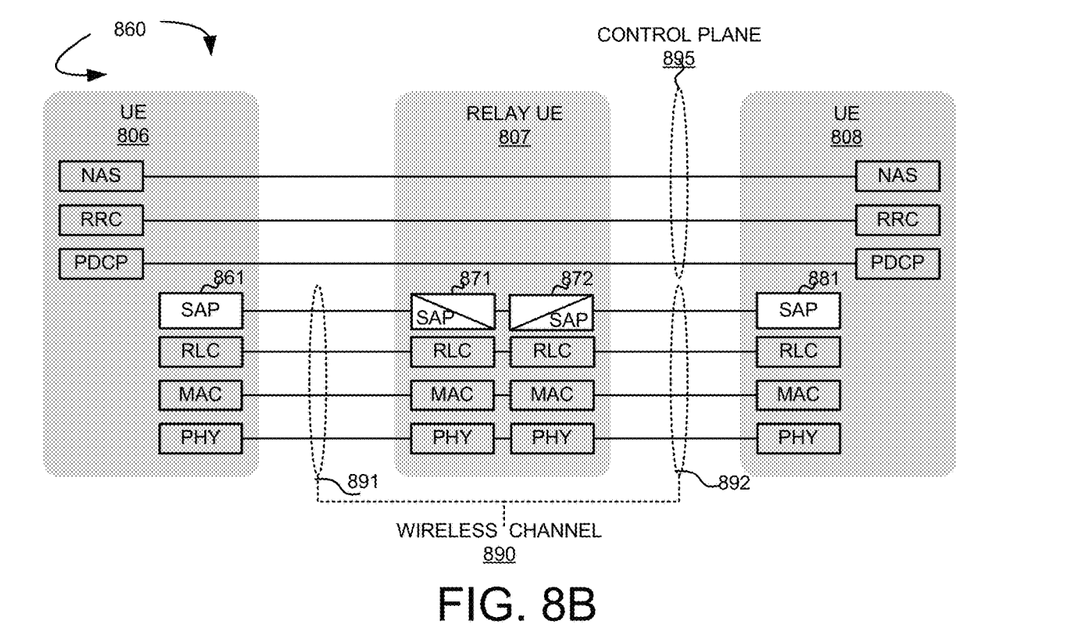
FIG. 8B illustrates an exemplary control plane protocol stacks for relay path between the originator UE and the destination UE with a relay UEs in accordance with embodiments of the current invention.

FIG. 8B illustrates an exemplary control plane protocol stacks for relay path between the originator UE and the destination UE with a relay UEs in accordance with embodiments of the current invention. An exemplary relay path stacks 860 includes protocol stacks of two end-nodes, an origination node 806 and a destination node 808, and a relay node UE 807. The lower layer wireless channel 890 is established through the PHY, MAC, RLC and ADAPT layers of each node on the relay path. A first wireless link 891 is established between UE 806 lower layer stack and a first lower layer protocol stack of relay node 807. A second wireless link 892 is established between the second lower layer protocol stack of relay node 807 and a lower layer protocol stack end-point UE 808. The lower layer links 891 and 892 are sidelink channels. On the control plane, end-to-end protocol connection 895 is established directly between the protocol stacks at the NAS layer, the RRC layer and the PDCP layer of end-nodes UE 801 and 804. The ADAPT/SAP layer of each node is used for packet routing of the L2-based sidelink relay. In one embodiment, the relay node is configured with two ADAPT layer stack. Relay node 807 has ADAPT/SAP 871 and 872. Each ADAPT stack of the relay nodes is connected with an end-node ADAPT stack. ADAPT 871 of relay node 807 is connected with ADAPT 861 of end-node 806. ADAPT 872 of relay node 807 is connected with ADAPT 881 of end-node 808. Each ADAPT/SAP layer has an adaptation layer address (ALA).

For both user plane and control plane protocol stacks illustrated above, the SAP layer is introduced on top of RLC layer for purpose of packet routing and other functionalities, including radio bearer mapping, flow control, radio link failure (RLF) indication etc. The sidelink communication between relay UE and end-point UE, or two relay UEs is based on the RLC channel over the sidelink interface, such as the PC5 interface. Each ADAPT layer is associated with a unique ALA to address a node within the sidelink relay path. The SAP layer of a relay UE, also called an intermediate node, performs bearer mapping between the ingress logical channel and the egress logical channel for the received data packet data unit (PDU) based on a predefined mapping rule. In one embodiment, bearer mapping is based on the indicated QoS information embedded within the SAP header. The QoS information can be packet QoS identifier (PQI) value defined in Table 5.4.4-1 of 3GPP TS 23.287 v16.0.0, Default Priority Level, defined in Table 5.4.4-1 of 3GPP TS 23.287 v16.0.0, ProSe-Per-Packet-Priority value, defined in 3GPP T523.303 v15.0.0, or any equivalent value. In one embodiment, bearer mapping is based on a fixed logical channel configuration with one logical channel associated with a fixed priority. All the nodes in the relay path adopt consistent fixed logical channel configuration for both ingress logical channels and egress logical channels. For example, the PDU received at the ingress logical channel with a high priority is mapped to the egress logical channel with the same level of priority. The fixed logical channel configuration can be configured via pre-configuration, system information or dedicated RRC signaling from the base station. The SAP layer of an intermediate node performs packet routing for a received PDU between the incoming port and the outgoing port.

Figure 9A:
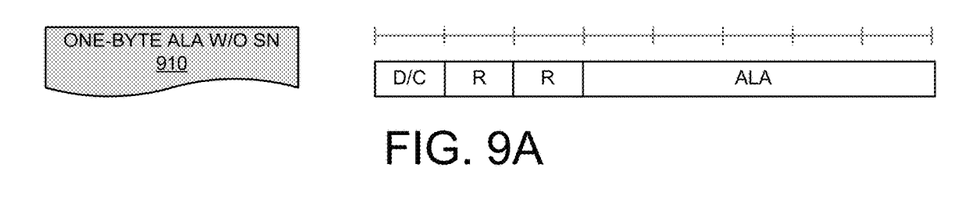
FIG. 9A illustrates an exemplary placement of a one-byte ALA without SN in a SAP header in accordance with embodiments of the current invention.
Figure 9B:
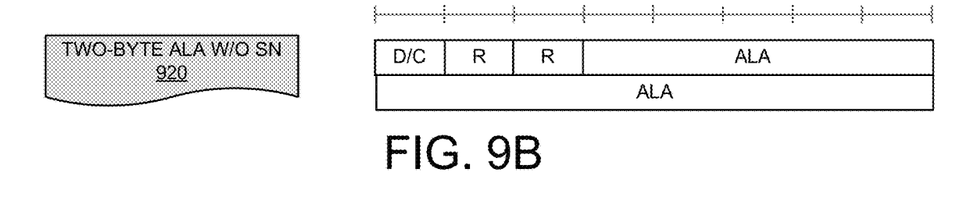
FIG. 9B illustrates an exemplary placement of a two-byte ALA without SN in a SAP header in accordance with embodiments of the current invention.
Figure 9C:
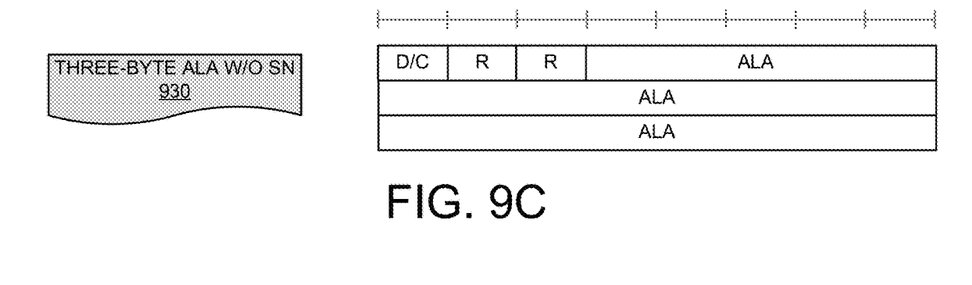
FIG. 9C illustrates an exemplary placement of a three-byte ALA without SN in a SAP header in accordance with embodiments of the current invention.

The ALA in the SAP header represents the destination address of a particular SAP service data unit (SDU). When the intermediate node within the sidelink relay path receives the packet, it looks up an entry matching to ALA of SAP header of the packet and decides the next hop ALA address according to a previously configured routing table within the node context. In one embodiment, the SN is not included in the SAP header. FIG. 9A illustrates an exemplary placement of a one-byte ALA without SN 910 in a SAP header in accordance with embodiments of the current invention. FIG. 9B illustrates an exemplary placement of a two-byte ALA 920 without SN in a SAP header in accordance with embodiments of the current invention. FIG. 9C illustrates an exemplary placement of a three-byte ALA without SN 930 in a SAP header in accordance with embodiments of the current invention.

Figure 9D:
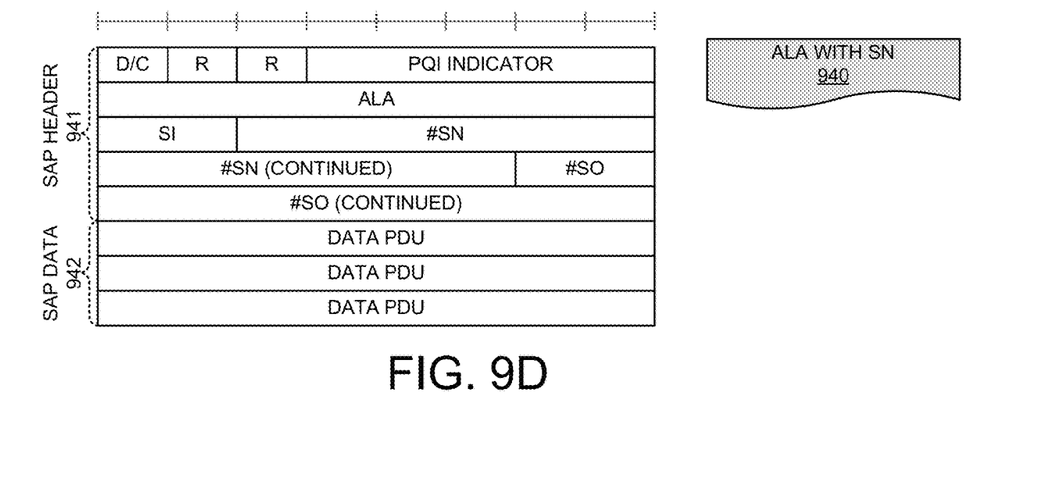
FIG. 9D illustrates an exemplary SAP header for a SAP SDU with segmentation at the origination/source node in accordance with embodiments of the current invention.

FIG. 9D illustrates an exemplary SAP header for a SAP SDU with segmentation at the origination/source node in accordance with embodiments of the current invention. In another embodiment, the SN is included in the SAP header. Data packet 940 includes the SAP header 941 and SAP data 942. The SN of SAP is placed within the SAP header following the ALA field. The SN supports multiple length according to the configuration. The SAP header 941 also includes the SI field for segment information, and the SO field for segmentation offset. When segmentation applies to a SAP SDU, the SI field is inserted to indicate whether an SAP SDU contains a complete SAP SDU or the first, middle, last segment of an SAP SDU. When segmentation applies to a SAP SDU, the SO field is inserted to indicate the position of the RLC SDU segment in bytes within the original RLC SDU.

In one embodiment, the SAP protocol layer of source node allocates an SAP SN and insert it into the packet from upper layer (i.e. PDCP) for a SAP SDU before its transmission. In one embodiment, the SAP protocol layer of source node concatenates multiple received packets from upper layer (i.e. PDCP layer) into a single packet and assigns a new SN before transmitting it to lower layer (i.e. RLC). In one embodiment, the SAP protocol layer of source node segments a single received packet from upper layer (i.e. PDCP layer) into a plural of packets and assigns new SN(s) before transmitting it to lower layer (i.e. RLC). The intermediate relay UE reuses the same SN numbered by the source node during the period the packet is delivered from the source node to the destination node.

Figure 10:
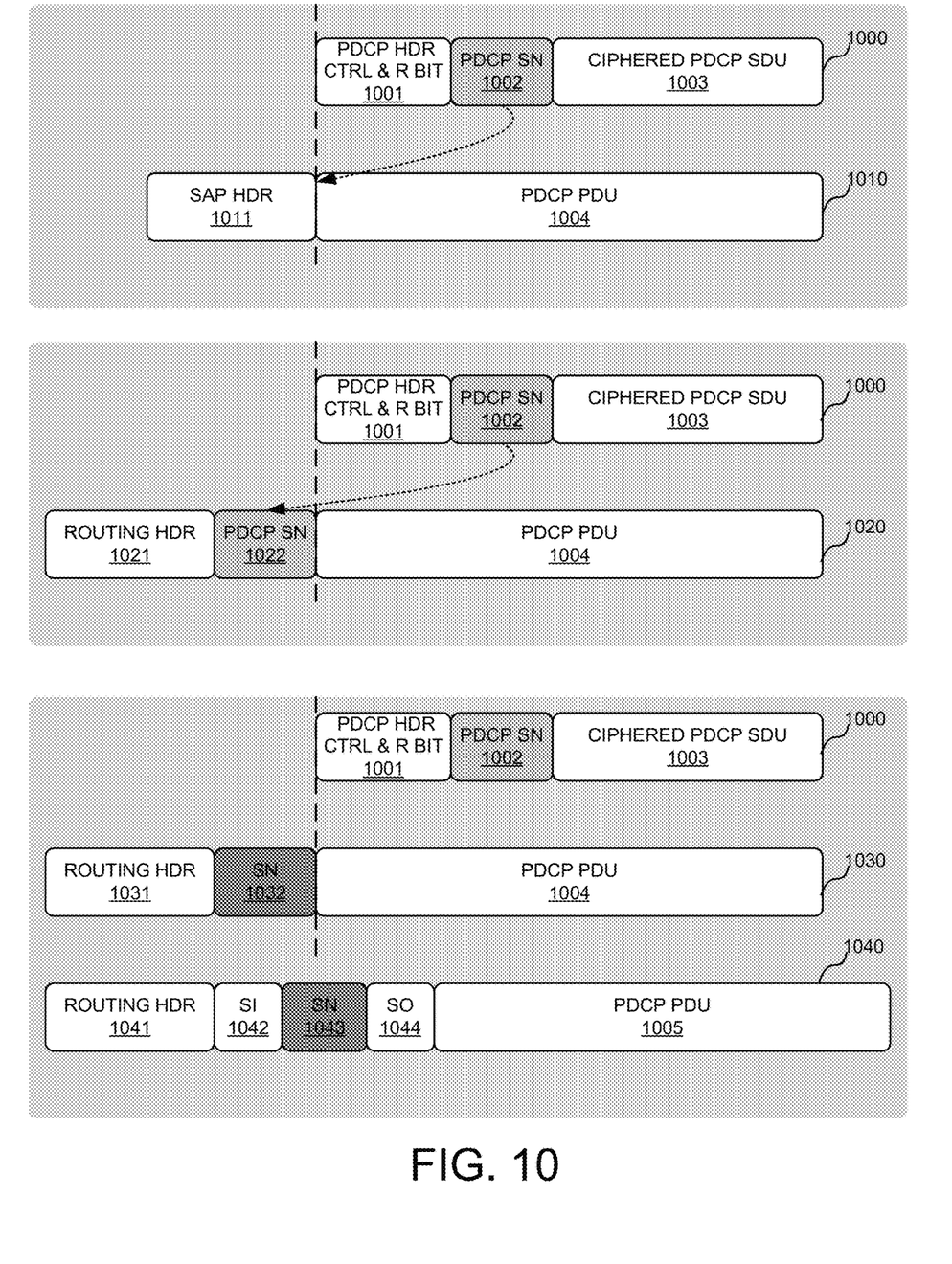
FIG. 10 illustrates exemplary diagrams of SAP SN handlings for sidelink relay in accordance with embodiments of the current invention.

FIG. 10 illustrates exemplary diagrams of SAP SN handlings for sidelink relay in accordance with embodiments of the current invention. An exemplary upper layer PDCP packet 1000 includes a PDCP header comprising control and reserve bit 1001, a PDCP SN 1002 and a ciphered PDCP SDU 1003. The SAP layer receives the PDCP PDU 1004, which includes the PDCP header 1001, PDCP SN 1002 and PDCP SDU 1003. In one embodiment, the SAP layer inserts a SAP header 1011 before the PDCP PDU 1004. The SAP PDU 1010 includes the SAP header 1011 and PDCP PDU 1004. In this embodiment, there is no SN in the SAP header. The SAP layer obtains the PDCP SN 1002 from the PDCP layer and uses the SN. The SAP layer does not assign SAP layer SN. The SAP layer reads the PDCP header 1001 of the packets to do packet sequence check during the transmission. All of SAP layer along with the transmission path needs to extract the PDCP packets before any sequence check operation.

In another embodiment, the SAP layer of the sender read the SN assigned by its upper PDCP layer. The SAP layer put this PDCP SN 1002 into the SAP header. The SAP PDU 1020 includes SAP header and PDCP PDU 1004. The SAP header includes the routing header 1021 and PDCP SN 1022, which is the same as the PDCP SN 1002. This requires SAP to reuse the SN of PDCP assigned by the sender. This means that all of the SAP layer along with the transmission path of the packets needs apply these particular PDCP SNs in the SAP header to do data split/aggregation/network coding/retransmission operation. This will introduce some restriction for the intermediate relay UE node for re-numbering the packets. The PDCP layer sends the length information of the PDCP SN to the SAP layer for all packets that are subject to relay transmission. According to this length information, SAP layer extracts the SN fields from the PDCP header.

In yet another embodiment, SAP PDU 1030 includes SAP header and PDCP PDU 1004. The SAP header includes routing header 1031 and SAP SN 1032. SAP SN 1032 is assigned by the SAP layer. This specific SAP SN is used to do data split/aggregation/network coding/retransmission operation. Each relay UE node along with the transmission path can re-assign the SN and re-codes the packet flow. The inferior nodes do the same thing. The largest flexibility can be achieved with the cost of complexity during the transmission. SAP PDU 1040 includes the SAP header and a segmented PDCP PDU 1005. The SAP header includes routing header 1041, SI 1042, SN 1043 and SO 1044.

In one embodiment, the intermediate Relay UE(s) reassign the SN to the packets when it receives a packet or a plural of packets from the lower layer (i.e. RLC layer). In another embodiment, the intermediate Relay UE may concatenate multiple received packets into a single packet and assign a new SN before transmitting it the egress RLC channel. In yet another embodiment, the intermediate Relay UE may segment a single received packet into multiple packets and assign new SN(s) before transmitting it the egress RLC channel. When segmentation applies to a SAP Service Data Unit, the SI field is inserted to indicate whether an SAP SDU contains a complete SAP SDU or the first, middle, last segment of an SAP SDU. When segmentation applies to a SAP Service Data Unit, the SO field is inserted to indicate the position of the RLC SDU segment in bytes within the original RLC SDU. Between any of the two hops of the sidelink relay path, the SAP layer of receiver side supports sending acknowledgement and non-acknowledgement of the received of one or more SAP packets to the sender side. The SAP of sender side polls the receiver side via SAP control PDU to feedback its reception status. Depending on the feedback from the receiver side, the sender side may retransmit one or a plural of SAP packets to the receiver side. The SAP layer of destination node supports in order delivery to its upper layer (i.e. PDCP layer) based on the numbered SN.

Figure 11:
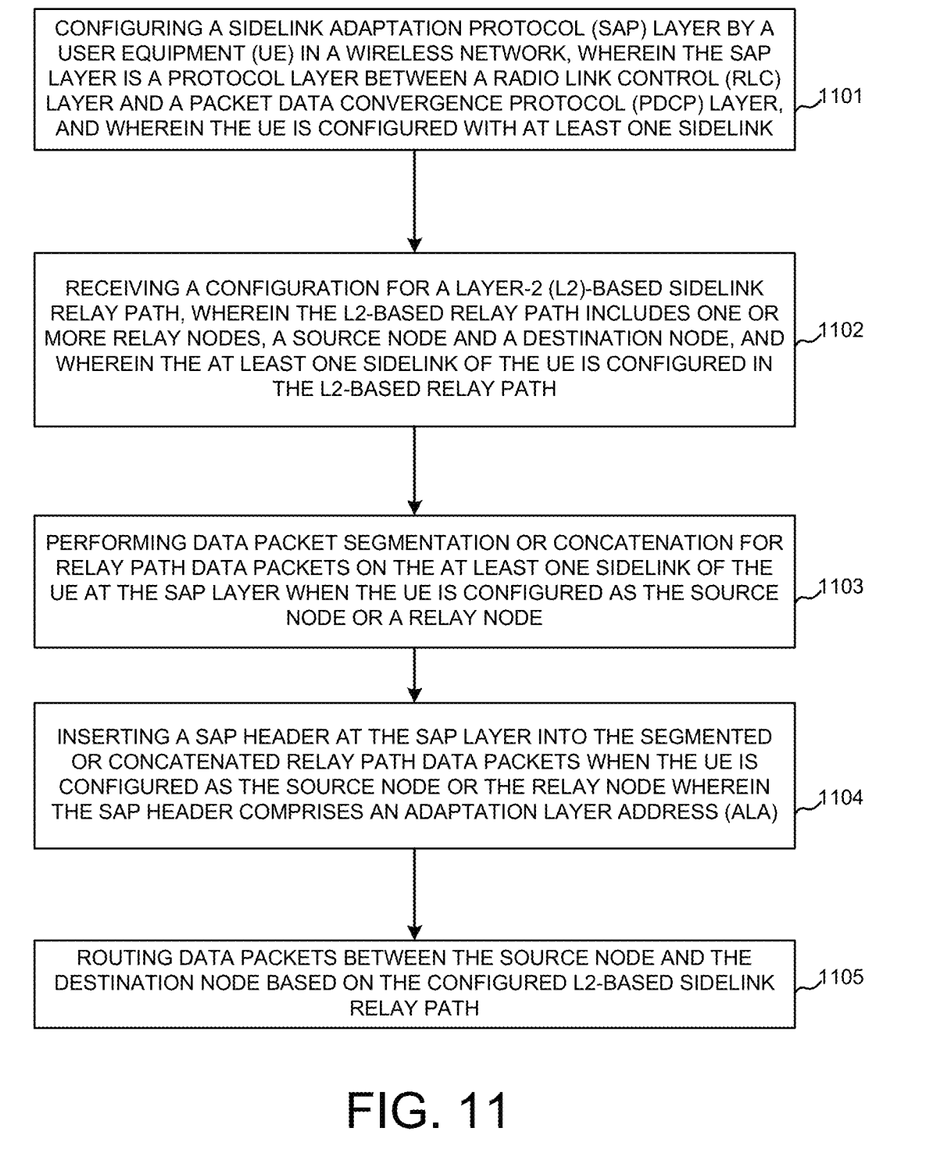
FIG. 11 illustrates an exemplary flow chart for adaptation handling for sidelink relay in accordance with embodiments of the current invention.

FIG. 11 illustrates an exemplary flow chart for adaptation handling for sidelink relay in accordance with embodiments of the current invention. At step 1101, the UE configures a sidelink adaptation protocol (SAP) layer in a wireless network, wherein the SAP layer is a protocol layer between a radio link control (RLC) layer and a packet data convergence protocol (PDCP) layer, and wherein the UE is configured with at least one sidelink. At step 1102, the UE receives a configuration for a layer-2 (L2)-based sidelink relay path, wherein the L2-based relay path includes one or more relay nodes, a source node and a destination node, and wherein the at least one sidelink of the UE is configured in the L2-based relay path. At step 1103, the UE performs data packet segmentation or concatenation for relay path data packets on the at least one sidelink of the UE at the SAP layer when the UE is configured as the source node or a relay node. At step 1104, the UE inserts a SAP header at the SAP layer into the segmented or concatenated relay path data packets when the UE is configured as the source node or a relay node wherein the SAP header comprises an adaptation layer address (ALA). At step 1105, the UE routs data packets between the source node and the destination node based on the configured L2-based sidelink relay path.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   configuring a sidelink adaptation protocol (SAP) layer by a user equipment (UE) in a wireless network, wherein the SAP layer is a protocol layer between a radio link control (RLC) layer and a packet data convergence protocol (PDCP) layer, and wherein the UE is configured with at least one sidelink;
   receiving a configuration for a layer-2 (L2)-based sidelink relay path, wherein the L2-based relay path includes one or more relay nodes, a source node and a destination node, and wherein the at least one sidelink of the UE is configured in the L2-based relay path;
   performing data packet segmentation or concatenation for relay path data packets on the at least one sidelink of the UE at the SAP layer when the UE is configured as the source node or a relay node;

inserting a SAP header at the SAP layer into the segmented or concatenated relay path data packets when the UE is configured as the source node or the relay node wherein the SAP header comprises an adaptation layer address (ALA); and routing data packets between the source node and the destination node based on the configured L2-based sidelink relay path.

2. The method of claim 1, wherein the SAP layer obtains a SAP layer sequence number (SN).

3. The method of claim 2, wherein the SAP layer performs data packet retransmission based on the obtained SAP layer SN.

4. The method of claim 2, wherein the UE is configured as the destination node, and where the SAP layer delivers data packets to upper layers in order based on the obtained SAP layer SN.

5. The method of claim 2, wherein the SAP layer header includes the ALA only, and wherein the SAP layer obtains a PDCP layer SN and used it as the SAP layer SN.

6. The method of claim 2, wherein the SAP layer SN is the same as a PDCP layer SN, and wherein the SAP layer header includes the SAP layer SN.

7. The method of claim 2, wherein the SAP layer assigns the SAP layer SN, and wherein the SAP layer header includes the SAP layer SN.

8. The method of claim 1, wherein the UE is configured as the relay node, and wherein the SAP layer performs bearer mapping between an ingress logical channel and an egress logical channel.

9. The method of claim 8, wherein the SAP header of incoming data packets further comprises QoS information for data packets, and wherein the bearer mapping is based on the QoS information.

10. The method of claim 8, wherein the bearer mapping is based on a fixed logical channel configuration with each logical channel associated with a fixed priority, and wherein the fixed logical channel configuration applies to all configured nodes for the L2-based sidelink relay path.

11. A user equipment (UE), comprising:
a transceiver that transmits and receives radio frequency (RF) signal in a wireless network;
an adaptation manager that configures a sidelink adaptation protocol (SAP) layer, wherein the SAP layer is a protocol layer between a radio link control (RLC) layer and a packet data convergence protocol (PDCP) layer, and wherein the UE is configured with at least one sidelink;
a relay path manager that receives a configuration for a layer-2 (L2)-based sidelink relay path, wherein the L2-based relay path includes one or more relay nodes, a source node and a destination node, and wherein the at least one sidelink of the UE is configured in the L2-based relay path;
a SAP packet handler that performs data packet segmentation or concatenation for relay path data packets on the at least one sidelink of the UE at the SAP layer when the UE is configured as the source node or a relay node;
a SAP header handler that inserts a SAP header at the SAP layer into the segmented or concatenated relay path data packets when the UE is configured as the source node or the relay node wherein the SAP header comprises an adaptation layer address (ALA); and
a data router that routs data packets between the source node and the destination node based on the configured L2-based sidelink relay path.

12. The UE of claim 11, wherein the SAP layer obtains a SAP layer sequence number (SN).

13. The UE of claim 12, wherein the SAP layer performs data packet retransmission based on the obtained SAP layer SN.

14. The UE of claim 12, wherein the UE is configured as the destination node, and where the SAP layer delivers data packets to upper layers in order based on the obtained SAP layer SN.

15. The UE of claim 12, wherein the SAP layer header includes the ALA only, and wherein the SAP layer obtains a PDCP layer SN and used it as the SAP layer SN.

16. The UE of claim 12, wherein the SAP layer SN is the same as a PDCP layer SN, and wherein the SAP layer header includes the SAP layer SN.

17. The UE of claim 12, wherein the SAP layer assigns the SAP layer SN, and wherein the SAP layer header includes the SAP layer SN.

18. The UE of claim 11, wherein the UE is configured as the relay node, and wherein the SAP layer performs bearer mapping between an ingress logical channel and an egress logical channel.

19. The UE of claim 18, wherein the SAP header of incoming data packets further comprises QoS information for data packets, and wherein the bearer mapping is based on the QoS information.

20. The UE of claim 18, wherein the bearer mapping is based on a fixed logical channel configuration with each logical channel associated with a fixed priority, and wherein the fixed logical channel configuration applies to all configured nodes for the L2-based sidelink relay path.

* * * * *